US012566486B2

(12) United States Patent
Matsumoto

(10) Patent No.: US 12,566,486 B2
(45) Date of Patent: Mar. 3, 2026

(54) SEMICONDUCTOR DEVICE

(71) Applicant: LAPIS Technology Co., Ltd.,
Yokohama (JP)

(72) Inventor: Takuya Matsumoto, Yokohama (JP)

(73) Assignee: LAPIS Technology Co., Ltd.,
Yokohama (JP)

( * ) Notice: Subject to any disclaimer, the term of this
patent is extended or adjusted under 35
U.S.C. 154(b) by 100 days.

(21) Appl. No.: 18/677,788

(22) Filed: May 29, 2024

(65) Prior Publication Data

US 2024/0402789 A1      Dec. 5, 2024

(30) Foreign Application Priority Data

Jun. 1, 2023    (JP) ................................. 2023-090822

(51) Int. Cl.
*G06F 1/32*          (2019.01)
*G06F 1/3287*        (2019.01)
(52) U.S. Cl.
CPC .................................. *G06F 1/3287* (2013.01)
(58) Field of Classification Search
CPC .................................................. G06F 1/3287
See application file for complete search history.

(56) References Cited

U.S. PATENT DOCUMENTS 12,400,687  B2 *  8/2025  Lin ........................ G11C 5/147
2017/0178718  A1 *  6/2017  Savanth ............. G11C 13/0002
2023/0050338  A1 *  2/2023  Kong ................. H03K 3/35625

FOREIGN PATENT DOCUMENTS

JP          2014067184          4/2014

* cited by examiner

*Primary Examiner* — Stefan Stoynov
(74) *Attorney, Agent, or Firm* — JCIPRNET

(57)                ABSTRACT
A semiconductor device is formed by first and second dies
manufactured by processes with different wiring widths and
includes: a first switch, outputting an input power voltage
when set to ON, and stopping output when set to OFF; and
a second switch, outputting, from a second voltage output
terminal, the power voltage output to a second voltage input
terminal when set to ON and stopping output when set OFF;
and at least one retention flip-flop, provided with: a first
power terminal, connected with the second voltage output
terminal; and a second power terminal, connected with the
first voltage output terminal, and maintaining data when the
power voltage is supplied to the second power terminal and
supply of the power voltage to the first power terminal is cut
off. The first switch is formed in a first die, and the second
switch and retention flip-flop are formed in a second die.

10 Claims, 2 Drawing Sheets

SEMICONDUCTOR DEVICE

CROSS-REFERENCE TO RELATED APPLICATION

This application claims priority under 35 USC 119 from Japanese Patent application No. 2023-090822 filed on Jun. 1, 2023, the disclosure of which is incorporated by reference herein.

BACKGROUND

Technical Field

The disclosure relates to a semiconductor device, and particularly relates to a semiconductor device having a retention flip-flop circuit.

Description of Related Art

In a register of a CPU, etc., a retention flip-flop circuit able to maintain a previous state when power supply is cut off is used. By using the retention flip-flop circuit, it is possible to quickly recover from a state in which power supply is temporarily cut off, such as a sleep state.

The retention flip-flop circuit, for example, includes a first power terminal receiving the supply of a power voltage via a first switch and a second power terminal receiving the supply of the power voltage via a second switch (see, for example, Japanese Laid-open No. 2014-67184). Even if the second switch becomes OFF and the supply of the power voltage to the second power terminal is cut off, the power voltage is supplied to the first power terminal via the first switch. Therefore, it is possible to maintain the state of a cell.

The retention flip-flop circuit in the configuration like the conventional art receives the supply of the power voltage via each of the first switch and the second switch. Therefore, at the time when the supply of the power voltage is cut off, an issue that a leak current equivalent to two switches is generated. In particular, in the case where two switches are mounted in a die formed by performing a miniaturization process with a small wiring width, there is an issue that the leak current that occurs may be large.

The disclosure reduces the leak current when the power supply is cut off in a semiconductor having the retention flip-flop circuit.

SUMMARY

An aspect of the disclosure provides a semiconductor device. The semiconductor device is formed by a first die manufactured by performing a first process with a large wiring width and a second die manufactured by performing a second process with a small wiring width. The semiconductor device includes: a first switch, provided with a first voltage input terminal and a first voltage output terminal, receiving input of a power voltage at the first voltage input terminal, outputting, from the first voltage output terminal, the power voltage that is input when set to an ON state, and stopping output from the first voltage output terminal when set to an OFF state; and a second switch, provided with a second voltage input terminal and a second voltage output terminal, receiving, at the second voltage input terminal, input of the power voltage output from the first voltage output terminal of the first switch, outputting, from the second voltage output terminal, the power voltage that is input when set to the ON state, and stopping output from the second voltage output terminal when set to an OFF state; and at least one retention flip-flop, provided with: a first power terminal, connected with the second voltage output terminal of the second switch; and a second power terminal, connected with the first voltage output terminal of the first switch, and maintaining data in a state in which the power voltage is supplied to the second power terminal and supply of the power voltage to the first power terminal is cut off. The first switch is formed in the first die, and the second switch and the at least one retention flip-flop are formed in the second die.

Another aspect of the disclosure provides a semiconductor device. The semiconductor includes: a first die, comprising a first switch having a first voltage input terminal and a first voltage output terminal, receiving input of a power voltage to the first voltage input terminal, and outputting the power voltage that is input from the first voltage output terminal when set to an ON state; and a second switch, having a second voltage input terminal and a second voltage output terminal, receiving, at the second voltage input terminal, input of the power voltage output from the first voltage output terminal of the first switch, and outputting, from the second voltage output terminal, the power voltage that is input when set to the ON state; and at least one retention flip-flop, having: a first power terminal, connected with the second voltage output terminal of the second switch; and a second power terminal, connected with the first voltage output terminal of the first switch, and maintaining data in a state in which the power voltage is supplied to the second power terminal and supply of the power voltage to the first power terminal is cut off.

Yet another aspect of the disclosure provides a semiconductor device. The semiconductor is configured to be connectible with a die provided with a switch that receives input of a power voltage at a voltage input terminal and outputs, from a voltage output terminal, the power voltage that is input when being in an ON state. The semiconductor device includes: a first switch, having a first voltage input terminal and a first voltage output terminal, receiving, at the first voltage input terminal, input of the power voltage output from the voltage output terminal of the switch, and outputting, from the first voltage output terminal, the power voltage that is input when set to the ON state; and at least one retention flip-flop, having: a first power terminal, connected with the first voltage output terminal of the first switch; and a second power terminal, connected with the voltage output terminal of the switch, and maintaining data in a state in which the power voltage is supplied to the second power terminal and supply of the power voltage to the first power terminal is cut off.

DESCRIPTION OF THE EMBODIMENTS

Figure 1:
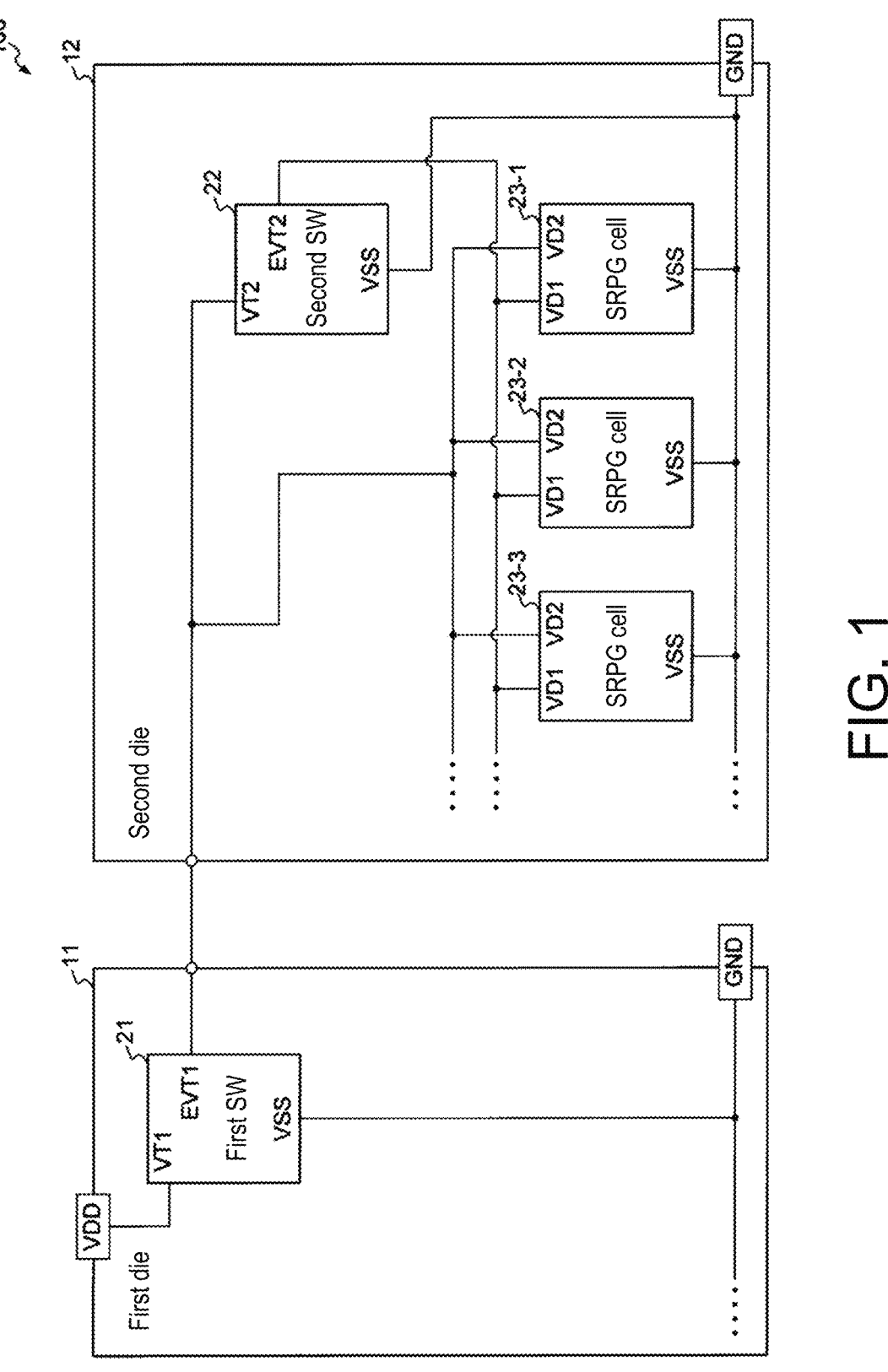
FIG. 1 is a block diagram illustrating a configuration of a semiconductor device according to the disclosure.

According to the semiconductor device according to the disclosure, it is possible to reduce the leak current resulted in when the power supply is cut off in a semiconductor having the retention flip-flop circuit.

In the following, the embodiments of the disclosure are described with reference to the drawings. In the following description of the embodiments and the accompanying drawings, substantially the same or equivalent parts are provided with the same reference numerals.

FIG. 1 is a block diagram illustrating a configuration of a semiconductor device 100 according to the disclosure. The semiconductor device 100 is a storage device used in a register of a central processing unit (CPU), for example. The semiconductor device 100 is formed by a first die 11 and a second die 12.

The first die 11 is a semiconductor chip manufactured by performing a first process, which is a process with a large wiring width (the so-called legacy process). The first die 11 includes a first switch 21 (shown as a first SW 21 in FIG. 1). In addition to the first switch 21, the first die 11 is formed with an analog circuit, such as an AD converter, a DA converter, a phase locked loop (PLL), a regulator, etc.

The first switch 21 has a voltage input terminal VT1, a voltage output terminal EVT1, and a ground terminal VSS. The voltage input terminal VT1 is an input terminal of a power voltage and connected with a VDD power source. The voltage output terminal EVT1 is an output terminal of the power voltage, and the power voltage input to the voltage input terminal VT1 is output from the voltage output terminal EVT1. The ground terminal VSS is a terminal that receives supply of a ground potential, and is connected with GND (ground).

By being controlled to be ON and OFF, a state of the first switch 21 is switched to an output state in which the power voltage is output and an output stoppage state in which the output of the power voltage is stopped. That is, in the ON state, the first switch 21 outputs the power voltage input to the voltage input terminal VT1 from the voltage output terminal EVT1. Meanwhile, in the OFF state, the first switch 21 stops the output of the power voltage from the voltage output terminal EVT1.

The second die 12 is a semiconductor chip manufactured by performing a second process, which is a process with a small wiring width (the so-called miniaturization process). The second die 12 has a second switch 22 (shown as a second SW 22 in FIG. 1) and has state retention power gating (SRPG) cells 23-1 to 23-$n$ (n being an integer of 2 or more). In FIG. 1, among the SRPG cells 23-1 to 23-$n$, only SRPG cells 23-1, 23-2, and 23-3 are extracted and shown. Moreover, in the second die 12, in addition to the switches and the SRPG cells, a logic circuit of a control system that handles processing control of the CPU.

The second switch 22 has a voltage input terminal VT2, a voltage output terminal EVT2, and a ground terminal VSS. The voltage input terminal VT2 is an input terminal of the power voltage, and is connected with the voltage output terminal EVT1 of the first switch 21. The voltage output terminal EVT2 is an output terminal of the power voltage, and the power voltage input to the voltage input terminal VT2 is output from the voltage output terminal EVT2. The ground terminal VSS is a terminal that receives supply of the ground potential, and is connected with GND (ground).

By being controlled to be ON and OFF, a state of the second switch 22 is switched to an output state in which the power voltage is output and an output stoppage state in which the output of the power voltage is stopped. That is, in the ON state, the second switch 22 outputs the power voltage input to the voltage input terminal VT2 from the voltage output terminal EVT2. Meanwhile, in the OFF state, the second switch 22 stops the output of the power voltage from the voltage output terminal EVT2.

The SRPG cells 23-1 to 23-$n$ are retention flip-flops configured to be able to maintain (referred to as retain or retention) data when the power is cut off, such as flip-flops of the CPU. Each of the SRPG cells 23-1 to 23-3 has a first power terminal VD1, a second power terminal VD2, and a ground terminal VSS.

The first power terminal VD1 is a first power terminal receiving the supply of the power voltage, and is connected with the voltage output terminal EVT2 of the second switch 22. The second power terminal VD2 is a second power terminal receiving the supply of the power voltage, and is connected with the voltage output terminal EVT1 of the first switch 21. The ground terminal VSS is a terminal that receives supply of the ground potential, and is connected with GND (ground).

In the semiconductor device 100 of the embodiment, by controlling the first switch 21 and the second switch 22 to be ON and OFF, the states of the SRPG 23-1 to 23-3$n$ are changed.

In the case where the SRPG 23-1 to 23-$n$ are in a retention state, the first switch 21 is controlled to be ON, and the second switch 22 is controlled to be OFF. With the second switch 22 being turned OFF, the supply of the power voltage to the first power terminal VD1 is cut off, and the first switch 21 is ON. Therefore, the second power terminal VD2 continues to be supplied with the power voltage. Accordingly, the SRPG 23-1 to 23-$n$ are in a state that maintains data, i.e., in the retention state.

Meanwhile, when the first switch 21 is in the OFF state, the supply of the power voltage to both of the first power terminal VD1 and the second power voltage VD2 is cut off. Accordingly, the power of the SRPG 23-1 to 23-$n$ is turned off.

In this way, when each of the first switch 21 and the second switch 22 is in the OFF state, a leak current is generated in the semiconductor device 100. Since the first switch 21 and the second switch 22 are connected in series, a current leakage equivalent to two switch stages occurs.

In the embodiment, the first switch 21 is provided in the first die 11 manufactured by performing the first process with a large wiring width. Meanwhile, the second switch 22 is provided in the second die 12 manufactured by performing the second process with a small wiring width. The die manufactured by performing a process with a small wiring length can realize a high-performance function, but, compared with a die manufactured by performing a process with a large wiring width, the leak current is larger.

In other words, the die manufactured by performing the first process exhibits the property that the leak current that occurs is smaller (referred to as low leakage in the following) than that of the die manufactured by performing the second process. Therefore, in the semiconductor device 100 of the embodiment, the leak current that occurs due to the first switch 21 is smaller than the leak current that occurs due to the second switch 22.

Figure 2:
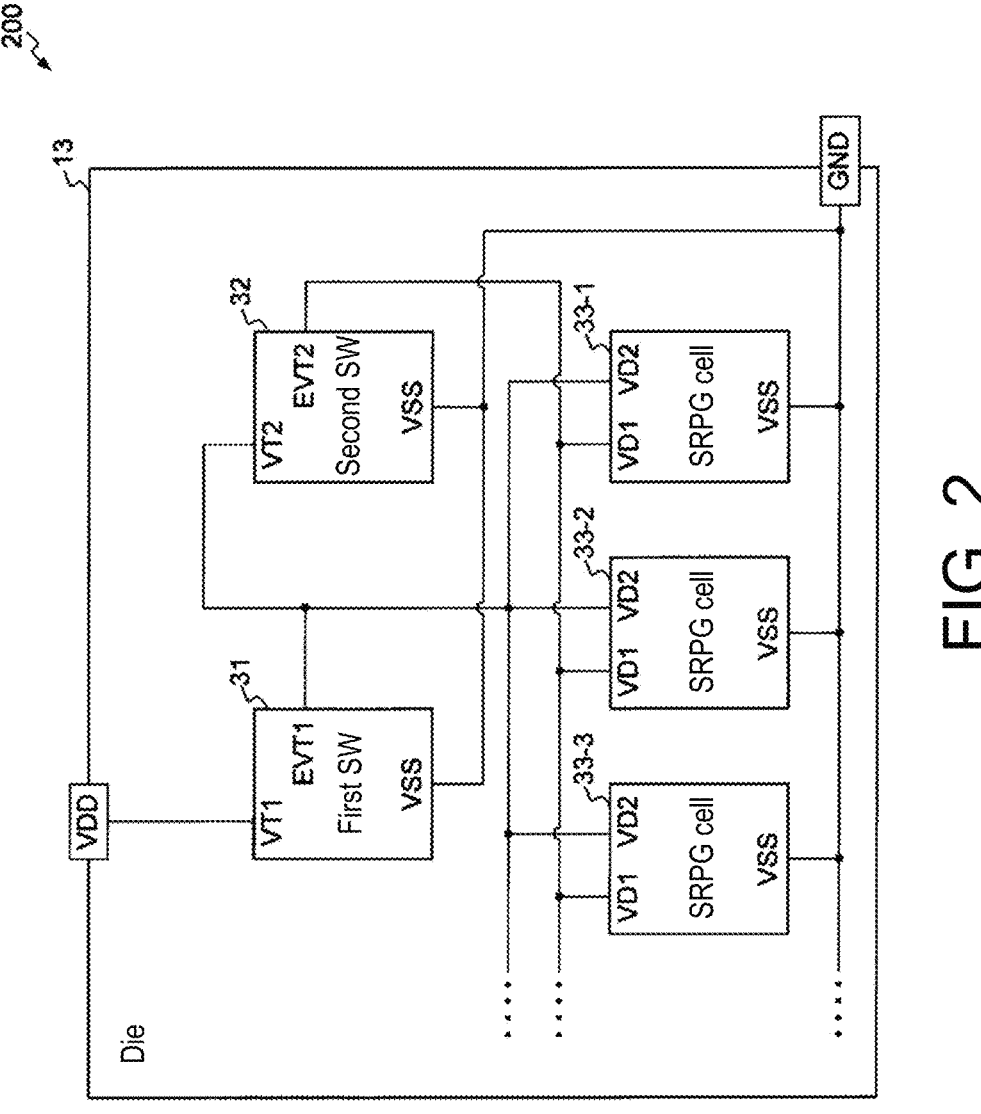
FIG. 2 is a block diagram illustrating a configuration of a semiconductor device of a comparative example.

Differing from the embodiment, FIG. 2 is a block diagram illustrating the configuration of a semiconductor device 200 of a comparative example provided in a die shared by a first switch 31 and a second switch 32. The semiconductor device 200 is formed by the first switch 31, the second switch 32, and SRPG cells 33-1 to 33-$n$.

In the semiconductor device 200 of the comparative example, the first switch 31 and the second switch 32 are provided in a die 13 manufactured by performing a process with a small wiring width. As described above, since the die manufactured by performing a process with a small wiring width has a higher leakage than a die manufactured by performing a process with a large wiring width, the leak current generated by each of the first switch 31 and the second switch 32 is larger than the leak current generated by a switch provided in a die manufactured by performing a process with a large wiring width.

Comparatively, in the semiconductor device 100 of the embodiment as shown in FIG. 1, the first switch 21 is formed in the first die 11 manufactured by performing the first process with a smaller leak current. Therefore, the leak current that occurs in the first switch 21 in the semiconductor device 100 of the embodiment is smaller than the leak current that occurs in the first switch 31 in the semiconductor switch 200 of the comparative example. Therefore, the leak current that occurs in the two switch stages with the first switch and the second switch is smaller in the semiconductor device 100 of the embodiment than in the semiconductor device 200 of the comparative example.

According to the above, with the configuration of the semiconductor device 100 of the embodiment, compared with the case where two switches are both formed in a die manufactured by performing a process with a small wiring width, the leak current of the entire device can be reduced.

Therefore, according to the semiconductor device 100 of the embodiment, the chance that a leak current occurs when the power supply is cut off can be reduced in a semiconductor device having a retention flip-flop circuit.

It is noted that the disclosure is not limited to the above embodiments. For example, in the embodiment, the case where the SRPG cells are used in the flip-flops of the CPU is described as an example. However, the disclosure is not limited thereto. All the flip-flops in the second die 12 or another cell may also be formed by SRPG cells.

Also, in the embodiment, the case where a logic circuit of a control system is formed in the second circuit 12 is described as an example. However, the disclosure is not limited thereto. A generally required circuit block may also be formed in a microcomputer, such as a RAM, a ROM, a flash memory, etc.

Also, in the embodiment, the case where multiple SRPG cells (23-1 to 23-n) are formed in the second die 12 is described as example. However, the number of the SRPG cells is not limited thereto, and it suffices as long as at least one SRPG is formed.

What is claimed is:

1. A semiconductor device, formed by a first die manufactured by performing a first process with a large wiring width and a second die manufactured by performing a second process with a small wiring width, the semiconductor device comprising:
    a first switch, provided with a first voltage input terminal and a first voltage output terminal, receiving input of a power voltage at the first voltage input terminal, outputting, from the first voltage output terminal, the power voltage that is input when set to an ON state, and stopping output from the first voltage output terminal when set to an OFF state; and
    a second switch, provided with a second voltage input terminal and a second voltage output terminal, receiving, at the second voltage input terminal, input of the power voltage output from the first voltage output terminal of the first switch, outputting, from the second voltage output terminal, the power voltage that is input when set to the ON state, and stopping output from the second voltage output terminal when set to an OFF state; and
    at least one retention flip-flop, provided with: a first power terminal, connected with the second voltage output terminal of the second switch; and a second power terminal, connected with the first voltage output terminal of the first switch, and maintaining data in a state in which the power voltage is supplied to the second power terminal and supply of the power voltage to the first power terminal is cut off,
    wherein the first switch is formed in the first die, and
    the second switch and the at least one retention flip-flop are formed in the second die.

2. The semiconductor device as claimed in claim 1, wherein the at least one retention flip-flop is formed by a state retention power gating (SRPG) cell.

3. The semiconductor device as claimed in claim 1, wherein the at least one retention flip-flop is a flip-flop circuit used in a register of a CPU, and
    a logic circuit handling processing control of the CPU is formed in the second die together with the second switch and the at least one retention flip-flop.

4. The semiconductor device as claimed in claim 3, wherein an analog circuit is formed in the first die together with the first switch.

5. A semiconductor device, comprising:
    a first die, comprising a first switch having a first voltage input terminal and a first voltage output terminal, receiving input of a power voltage to the first voltage input terminal, and outputting the power voltage that is input from the first voltage output terminal when set to an ON state; and
    a second switch, having a second voltage input terminal and a second voltage output terminal, receiving, at the second voltage input terminal, input of the power voltage output from the first voltage output terminal of the first switch, and outputting, from the second voltage output terminal, the power voltage that is input when set to the ON state; and at least one retention flip-flop, having: a first power terminal, connected with the second voltage output terminal of the second switch; and a second power terminal, connected with the first voltage output terminal of the first switch, and maintaining data in a state in which the power voltage is supplied to the second power terminal and supply of the power voltage to the first power terminal is cut off.

6. The semiconductor device as claimed in claim 5, wherein the first switch stops output from the first voltage output terminal when in an OFF state, and
    the second switch stops output from the second voltage output terminal when in the OFF state.

7. The semiconductor device as claimed in claim 5, wherein the at least one retention flip-flop is formed by a state retention power gating (SRPG) cell.

8. The semiconductor device as claimed in claim 5, wherein the at least one retention flip-flop is a flip-flop circuit used in a register of a CPU, and
    the second die comprises a logic circuit handling processing control of the CPU.

9. The semiconductor device as claimed in claim 8, wherein the first die comprises an analog circuit connected with the first switch.

10. A semiconductor device, configured to be connectible with a die provided with a first switch that receives input of a power voltage at a voltage input terminal and outputs, from a voltage output terminal, the power voltage that is input when being in an ON state, the semiconductor device comprising:
    a second switch, having a first voltage input terminal and a first voltage output terminal, receiving, at the first voltage input terminal, input of the power voltage output from the voltage output terminal of the first switch, and outputting, from the first voltage output terminal, the power voltage that is input when set to the ON state; and at least one retention flip-flop, having: a first power terminal, connected with the first voltage output termi-
nal of the second switch; and a second power terminal, connected with the voltage output terminal of the first switch, and maintaining data in a state in which the power voltage is supplied to the second power terminal and supply of the power voltage to the first power 
terminal is cut off.

* * * * *